United States Patent [19]

Kemp, II

[11] Patent Number: 5,791,371
[45] Date of Patent: Aug. 11, 1998

[54] VALVE LOCK

[76] Inventor: William W. Kemp, II, 104 Bayou Gardens Dr., Houma, La. 70364-1403

[21] Appl. No.: 829,643

[22] Filed: Mar. 31, 1997

[51] Int. Cl.⁶ ............................................. F16K 27/08
[52] U.S. Cl. ........................... 137/383; 137/233; 137/327; 137/377; 152/431
[58] Field of Search ..................... 137/327, 377, 137/383, 233, 234; 152/431

[56] References Cited

U.S. PATENT DOCUMENTS

| | | | |
|---|---|---|---|
| 1,012,898 | 12/1911 | Neal | 137/327 |
| 1,265,465 | 5/1918 | McComb | 152/431 |
| 1,277,606 | 6/1918 | Kohn | 137/377 |
| 1,306,495 | 6/1919 | Millea | 152/431 |
| 1,392,440 | 10/1921 | Newsom | 137/234 |
| 1,640,863 | 8/1927 | Terrell et al. | 152/431 |
| 1,666,562 | 4/1928 | Gits | 137/233 |
| 2,943,665 | 7/1960 | Cincel | |
| 2,963,046 | 12/1960 | Goodrich | |
| 2,978,896 | 4/1961 | Spaccone | |
| 3,064,705 | 11/1962 | Brown et al. | |
| 4,324,196 | 4/1982 | Molgaard | 137/383 |
| 5,090,223 | 2/1992 | Ruffler | |
| 5,597,010 | 1/1997 | Hoffman et al. | 137/381 |

*Primary Examiner*—A. Michael Chambers
*Attorney, Agent, or Firm*—Kenneth L. Tolar

[57] ABSTRACT

The present invention relates generally to a valve lock for use in conjunction with a valve stem contained on an inflatable tire. The device comprises a hollow tubular component that receives the valve stem. A plurality of fingers are attached to the inner wall of the tube component and grip the valve stem holding the tube component in place. Also disclosed is a locking cap that threadedly engages the fingers causing them to tighten against the exterior of the valve stem. The locking cap can only be removed with the use of a matching key that is inserted into matching indentations on the locking cap.

10 Claims, 2 Drawing Sheets

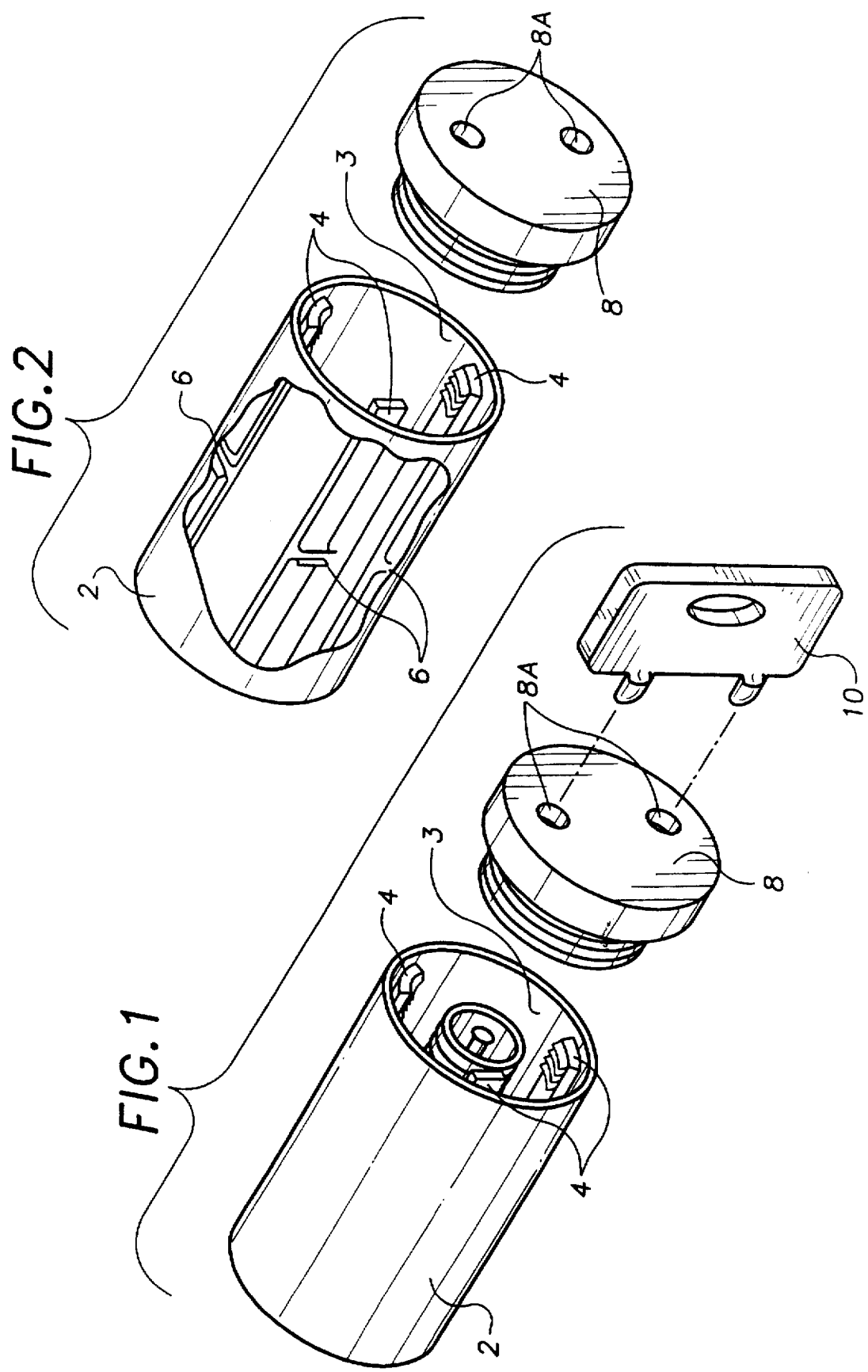

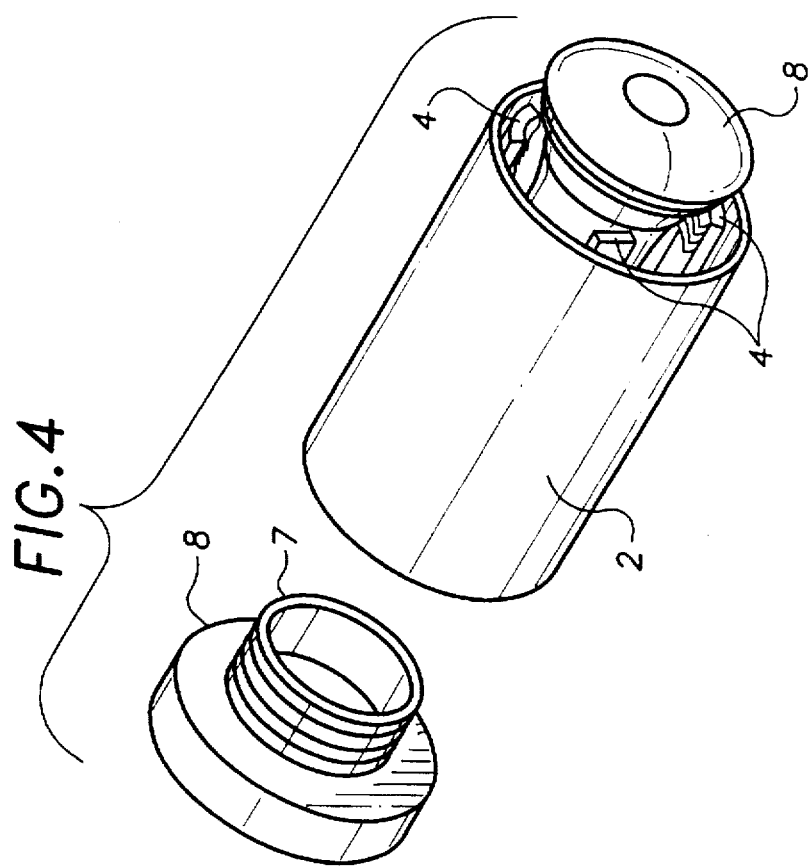
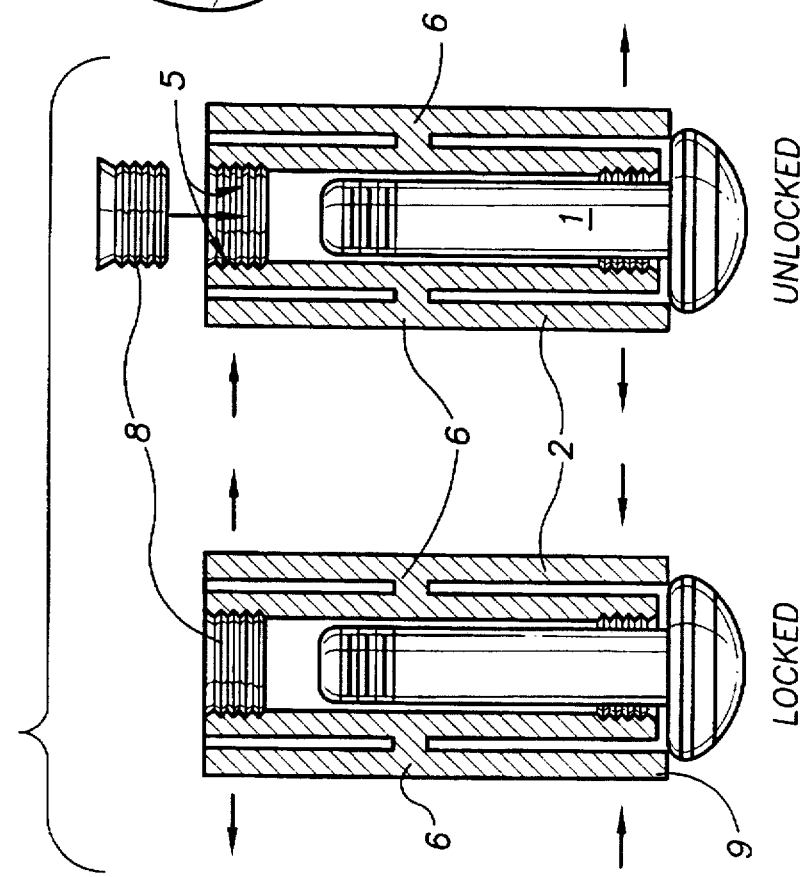

VALVE LOCK

BACKGROUND OF THE INVENTION

The present invention relates to a new and improved valve lock which prevents tampering with a valve stem of any automobile or other air filled tire. The valve lock can be easily attached to the valve stem and locked into place with a matching key that is specifically designed for a particular set (1 or more) of valve locks.

DESCRIPTION OF THE PRIOR ART

Exposed valve stems on automobile or bicycle tires are currently an easy target for pranksters or vandals. Vandals can easily unscrew the valve stem caps and let the air out of the tires, or, they can even cut off the valve stem completely. Accordingly, there is a need for a protective device that cannot be removed by unauthorized persons that would prevent such tampering with a valve stem. Valve stem locks and similar devices are generally known in the prior art but this invention relates to constructional improvements over the prior art devices. The present invention is much simpler and less costly to manufacture, is easier to remove, install and lock and provides additional safeguards that are not currently present in the prior art devices as more fully described below.

U.S. Pat. No. 2,978,896 issued to Spaccone discloses a combination hubcap and air valve lock. The device generally comprises a cylindrical member that threadedly engages the valve stem where the stem cap would normally be placed. The cylindrical member also contains a radially extending flange through which are a pair of bores. This cylindrical member is surrounded by an outer shield element also containing a pair of bores that are spaced directly above the bores located on the cylindrical member. This device is installed and removed by use of a key which contains first and second engaging members that are inserted into each pair of bores. The key can then be turned to rotate the device upon the threads of the valve stem thereby removing or tightening the device upon the valve stem. The device fits tightly against a hubcap preventing its removal and also protects the valve stem from tampering.

It is also important to note that the key contains spaced projections on the ends of the engaging members that are spaced to correspond to the bores contained in the air valve lock device. The spacing of these projections can be varied to permit different configurations of keys.

U.S. Pat. No. 3,064,705 issued to Brown discloses a valve stem lock which is specifically designed to prevent the inadvertent displacement of the valve stem inwardly through the tire rim in the event of tire deflation. The device generally consists of a body element and a cooperating clamp element which are bolted together and surround the valve stem. The body and cooperating clamp elements each contain flat wings that rest tightly against the tire rim. Therefore, in the event of deflation of the tire, the body and clamp elements press against the tire rim while holding the valve stem thus preventing it from being displaced inwardly through the aperture in the tire rim.

U.S. Pat. No. 5,090,223 issued to Ruffler discloses a car theft deterrent which when installed will automatically deflate the tire upon rotation unless the device is removed beforehand with the appropriate key. The device comprises a substantially U-shaped breakaway bar assembly that fits about an inflated tire. A lock assembly extends through one of the legs of the breakaway assembly and is threaded onto the valve stem of the tire. The lock assembly also contains a mechanism whereby the device can be locked with a key so that the breakaway bar assembly cannot be unthreaded from the valve stem. When the device is installed around a tire, rotation of the tire along with the weight of the vehicle will cause the device to rip out the valve stem thereby deflating the tire rapidly.

U.S. Pat. No. 2,963,046 issued to Goodrich discloses a cover for a tire valve cap in order to prevent losing or misplacing valve stem caps. The invention includes a dome cover that fits over a valve cap in addition to a retaining ring that fits around the valve stem just below the cap. The ring contains a lateral projection which contains an opening through which fits a flat spring. The flat spring contains a collar that fits around the cover thereby holding it and the cap secure to the valve stem preventing the cap from being displaced.

U.S. Pat. No. 2,943,665 issued to Cincel discloses a valve lock cap for preventing tampering with inflating valves of pneumatic tires, tubes, and so forth. The lock cap also contains a one-way valve which allows the tube to be inflated while the lock cap is in place. The device is removed and installed by a special tool that is similar to a hexagonal socket wrench.

While some of these inventions protect the valve stem from tampering, they are more difficult to install and remove from the tire stem. Also, these devices are attached to the valve stem by engaging and threading onto the threaded portion of the valve stem. Therefore, it would be an advantage to have a valve lock that is simple and inexpensive to manufacture, that may be quickly attached without having to thread onto the valve stem while having a locking means that prevents removal of the valve lock.

SUMMARY OF THE INVENTION

The present invention provides a new and improved valve lock for use with valve stems of inflatable tires such as those used on vehicles including automobiles and bicycles. It is therefore an object of the invention to provide an improved valve lock that can be quickly and easily installed or removed from a valve stem of an inflatable tire.

It is a further object of the present invention to provide a valve lock that cannot be removed when left unattended.

It is yet another object of the present invention to provide a valve lock that contains a locking cap which can only be removed with a key that matches the pattern and spacing of the indentations on top of the locking cap and cannot be removed with keys that are designed for other similar locking caps.

It is yet another object of the present invention to provide a new and improved attachment means for attaching said valve lock to a valve stem of an inflatable tire.

It is yet another object of the present invention to provide a valve lock that is easier and less expensive to manufacture than previous prior art valve locks.

Other objects, features, and advantages of the invention and its details of construction and arrangement of parts will be seen from the following description of the preferred embodiments when considered with the attached drawings and from the appended claims.

BRIEF DESCRIPTION OF THE DRAWINGS

FIG. 1 generally depicts the inventive device.

FIG. 2 shows the same device depicted in FIG. 1 including the internal attachment means.

FIG. 3 is a cross sectional view of the valve lock and locking cap as it would appear on a tire stem.

FIG. 4 shows the same valve lock including the attachment means engaging the base of a tire valve stem.

DESCRIPTION OF THE PREFERRED EMBODIMENT

Referring now to FIGS. 1-4, there is generally shown a valve lock as it would be applied to a valve stem on an inflatable tire. The valve lock comprises a hollow outer tube component 2 having a cylindrical inner wall 3 that generally defines the hollow portion. The hollow outer tube component 2 receives a valve stem as depicted in FIG. 3. Longitudinally received within said tube component 2 and attached to the inner wall 3 thereof is a plurality of fingers 4, said fingers 4 being connected to the inner wall 3 of the outer tube component 2 by means of a pivot 6. The fingers 4 each contain an internally reversely threaded end 5 as depicted in FIG. 2. The fingers 4 also each have a gripping end 9, directly opposite the threaded ends 5, each having a plurality of locking teeth as depicted in FIG. 3.

The valve lock also comprises a circular locking cap 8 which has an externally threaded portion 7, said threaded portion 7 also having reverse threads to threadedly engage the internally reversely threaded end 5 of said fingers 4.

The top of the locking cap 8 is designed with a plurality of circular indentations 8a which may be designed in a variety of different patterns and spaced from each other at varying distances. The indentations 8a are designed to receive a special key 10. The key 10 is generally a flat stamped piece constructed from metal or similar material with a plurality of male protrusions extending therefrom as depicted in FIG. 1. The male protrusions are specifically designed to exactly match the pattern contained on a particular circular locking cap 8, or a set of locking caps, so that only the user having a key containing protrusions that match the patterns and spacing of the indentations in the locking cap will be able to remove it.

The valve lock is secured around a valve stem by first placing the hollow tube component 2 around a valve stem as shown in FIG. 1 so that the fingers 4 are radially mounted about the exterior of the valve stem. The externally threaded portion 7 of the locking cap 8 threadedly engages the internally threaded end 5 of the fingers 4 and the locking cap 8 is turned in a counterclockwise direction in order to tighten the cap 8. Because the threaded portion 7 of the locking cap 8 is substantially conical in shape, the internally threaded end 5 of said fingers 4 are pushed outward and closer to the inner wall 3 of the hollow tube component 2 as the locking cap is tightened.

As the internally threaded ends 5 of said fingers 4 are pushed toward the inner wall 3 of the hollow tube component 2, the pivot 6 causes the opposite gripping end 9 of the fingers 4 to move inward toward the valve stem 1 in a seesaw fashion. Therefore, as the locking cap 8 is tightened, and the gripping ends 9 of the fingers 4 move toward the valve stem 1, the locking teeth on the gripping end 9 of the fingers 4 move toward the valve stem 1 and firmly engage the outer surface thereof.

When the circular locking cap 8 is fully tightened, the locking teeth of the fingers are so tightly pressed against the valve stem 1 that removing the valve lock is impossible. To unlock and remove the device, the key is re-inserted into the indentations 8a contained on top of the locking cap 8 and the key 10 and locking cap 8 is twisted in a clockwise direction.

Preferably, all the components of the valve lock, including the key and the pivot, should be manufactured using high impact Dellerin plastic or a similar material. The plastic injection molding process should allow mass producing of the valve lock at a reasonable cost. From the above descriptions, it is now apparent that the new invention provides a new and improved valve lock which is simpler to construct and install while preventing tampering with a valve stem of an inflatable tire.

It is understood that although there has been shown and described the preferred embodiment of the above described invention, that modifications may be made to the invention which do not exceed the scope of the appended claims. Accordingly, the scope of my invention is to be limited only by the following claims:

I claim:

1. A new and improved valve lock for use in conjunction with and installed on the exterior of an inflatable tire valve stem, the improvement comprising:

a) a hollow tube component for receiving the valve stem, said tube component having an inner wall;

b) a plurality of fingers received within said hollow tube component and connected to said inner wall, said fingers surrounding and engaging the exterior of the valve stem;

c) means for locking said tube member to the valve stem;

whereby said tube component is placed around the valve stem, the fingers tightly engage the valve stem and the device is locked into place preventing removal of the valve lock or tampering with the valve stem.

2. A valve lock according to claim 1 wherein each of said fingers further comprises a gripping end whereby each of said gripping ends tightly engages the exterior of the valve stem preventing removal of the tube component therefrom.

3. A valve lock according to claim 2 wherein each of said fingers further comprises a threaded end.

4. A valve lock according to claim 3 wherein each of said threaded ends of said fingers is internally threaded.

5. A valve lock according to claim 3 wherein said locking means further comprises a locking cap, said locking cap having a top end and a threaded portion; said threaded portion threadedly engaging the threaded end of said fingers.

6. A valve lock according to claim 5 wherein the top end of said locking cap further comprises a plurality of indentations.

7. A valve lock according to claim 5 wherein each of said fingers further comprise a pivot each having two ends with one end centrally attached to one of said fingers and the other end attached to said inner wall of said tube component whereby the threaded portion of said locking cap threadedly engages the threaded ends of said fingers and as the cap is rotated, the gripping ends of the fingers move inward until the gripping ends tightly engage the valve stem.

8. A valve lock according to claim 7 further comprising a key containing a plurality of protrusions selectively receivable within said indentations on said locking cap whereby the key protrusions may only be inserted into the indentations of a matching locking cap so that the valve lock attached and locked onto the valve stem or removed therefrom.

9. A valve lock according to claim 5 wherein said threaded portion of said locking cap and the threaded ends of said fingers each contain reverse threads so that the locking cap may only become unthreaded by rotating clockwise.

10. A valve lock according to claim 5 wherein said threaded portion of said locking cap is externally threaded.

* * * * *